Feb. 13, 1962 R. D. JACKEL 3,021,379
CERAMIC SEPARATORS FOR PRIMARY BATTERIES
Filed April 21, 1960

INVENTOR.
ROLAND D. JACKEL
BY
ATTORNEY

United States Patent Office 3,021,379
Patented Feb. 13, 1962

3,021,379
CERAMIC SEPARATORS FOR PRIMARY
BATTERIES
Roland D. Jackel, 3110 19th St. NW., Washington, D.C.
Filed Apr. 21, 1960, Ser. No. 23,859
6 Claims. (Cl. 136—145)
(Granted under Title 35, U.S. Code (1952), sec. 266)

This invention may be manufactured and used by or for the Government of the United States for governmental purposes without the payment of any royalties thereon or therefor.

This invention relates to separative diaphragms or separators for electrolytic cells and particularly to the production of a porous composite ceramic separator adapted for use in primary batteries of the fuel combustion type.

In the newer type of primary cells now being developed, the operating criteria for the materials used in separating the active materials from each other and in withstanding the more powerful electrolytes now in use has steadily increased. The physical, chemical, and electrical properties essential for the optimum separator or diaphragm are (1) a degree of mechanical rigidity; (2) dimensional stability; (3) a certain degree of flexibility; (4) porosity of such microscopic dimensions as to prevent migration of sediment from the active materials, thus preventing short circuits, and (5) a high degree of resistance to attack from the more powerful chemicals and substances being utilized in modern high performance primary cells.

Other important factors involved in the choice and development of such separative diaphragms are found in the principles of operation of the new type primary cells. Here, a gas, such as chlorine, bromine, iodine, or a mixture of these elements, may be used for the consumable cathode element in conjunction with an aqueous electrolyte and a consumable metal anode which may be of aluminum, magnesium, zinc, iron, or alloys of these metals. Since the gases are usually introduced under pressure and flow through the closed cell and since the electrolyte is circulated externally of the cell for the removal of waste products and heat, obviously the separators undergo mechanical and chemical stresses heretofore unknown.

Another important factor relating to the mechanical strength and dimensional stability of the separator is found in the desirability of keeping the cell elements, e.g., metal anode and carbon or other inert material diffuser, under a positive mechanical force to maintain element spacings constant as the anode is consumed. This requirement, which is essential to the development of large capacity primary batteries of this general type, obviously demands separator material which can withstand a considerable degree of compression while still maintaining dimensional stability. Related to the foregoing requirement is the additional element of overall area. In large capacity cells, the electrolyte elements may have considerable area in the nature of several square feet. Obviously, the area of the separator must conform thereto. The problem of supplying a separator having sufficient area and yet being thin and strong enough to properly perform electrochemically has been one of the stumbling blocks in the development of these high capacity primary sources of electromotive force.

Previously known materials such as wood, rubber, earthenware, diatomaceous earth, plastics, rubber or plastic covered wire meshes, glass wool or cloth or other synthetic fibers have been found unsuitable. Separators made of these materials, particularly those with the larger areas, have been found to fail either mechanically or by chemical corrosion.

The principal object of my invention, therefore, is to provide a separator or separative diaphragm for use in a fuel combustion type of primary source of electromotive force which is subject to none of the disadvantages of those materials previously used in secondary type cells.

A further object of my invention is to provide a ceramic separator unit or tile which may be assembled into a separative diaphragm having considerable mechanical strength and dimensional stability for use in primary batteries.

Another object of my invention is to provide a permeable ceramic separator for primary sources of electromotive force which is flexible and has a proper degree of porosity to pass the electrolytic fluids but will prevent migration of sediment from the active materials.

Still another object of my invention is to provide a method of production of ceramic separators for use in primary batteries which separators have the required mechanical strength, dimensional stability, porosity, and resistance to chemical and fluid corrosion for such use.

Other objects and advantages of my invention will become more apparent in connection with the following description and drawings wherein.

Figure 1:
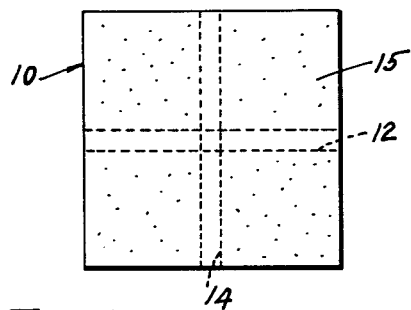
FIGURE 1 is an elevation of the basic ceramic separator unit.
Figure 2:
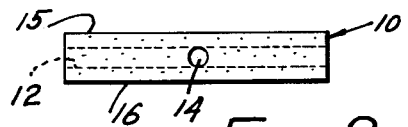
FIG. 2 is a plan view of the unit.

With reference to FIGS. 1 and 2, the basic separator unit or tile 10 is made as will be more fully described hereinafter. After production, horizontal and vertical holes 12 and 14 are drilled, or otherwise formed, from one edge to the other on the horizontal and vertical axes. These holes are further centrally disposed with relation to the faces 15 and 16 of the ceramic separator unit. While the dimensions of this basic unit are not necessarily limited to any particular value, it has been found that a practical size is approximately one inch square by one-eighth inch thick. The holes may be one-sixteenth to three-thirty seconds inches in diameter.

Figure 4:
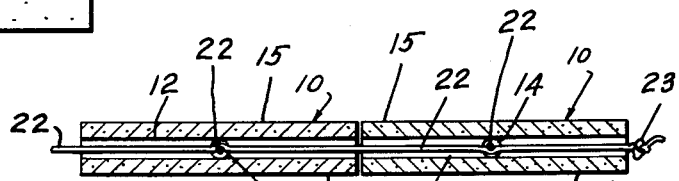
FIG. 4 is a cross-sectional view taken on the line 4—4 of FIG. 3.
Figure 3:
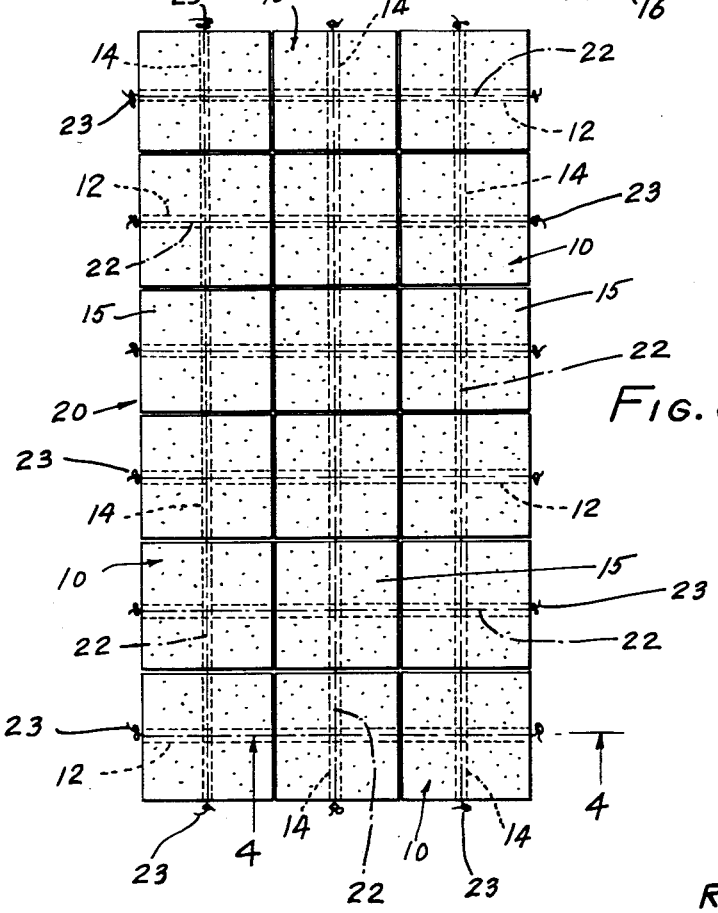
FIG. 3 is an elevation of the assembled separator.

As shown in FIGS. 3 and 4, after the basic porous ceramic separator unit 10 is produced and formed, the complete separator 20 may be formed by laying the required number of basic units in contiguous relationship and then threading through the aligned vertical and horizontal holes a thread or thin filament 22 of a suitable plastic material such as Dynel or Saran. These plastic materials have been found to possess sufficient chemical stability to be so used in the presence of chlorine or other of the halogens and concentrated electrolytes such as aqueous solutions of the halides of the anode metals. These filaments 22 are knotted, as at 23, at the edges, horizontal and vertical, of the separator 20 in order to retain the basic units in place. As will be apparent, this mode of construction provides a complete separator that has mechanical strength and dimensional stability but is yet sufficiently flexible to allow for variations in the surfaces of the active materials.

The basic permeable separator unit 10 is prepared and formulated as follows: To an intimate mixture of 80 parts by weight of finely ground talc, 10 parts of powdered barium carbonate, and 10 parts of a suitable ceramic clay, 1½ parts by weight of a suitable hydrocarbon emulsion, such as pitch, and 1½ parts by weight of a suitable corn binder, such as corn starch or mesh-graded corn meal, are slowly added. After the above listed materials are carefully mulled so that the hydrocarbon emulsion and corn binder are thoroughly and completely distributed throughout the body of the mix, the resultant emulsion-dampened powder is pressed into flat tiles or basic units of the size previously mentioned, i.e., 1 x 1 x ⅛ inch. The tiles or basic units are then fired at a temperature of 2250° F. for a period of nine hours. By proper control of the quantity and quality of the hydrocarbon emulsion, the mesh of the corn binder, i.e., its particle size, the pressure applied in pressing the tiles or basic units to shape and thickness, and the firing temperatures and times, the porosity and permeability of the ceramic unit can be controlled within satisfactory limits for the application herein described.

After the tiles or basic separator unit are formed as described above, the holes 12 and 14 are drilled, preferably with a diamond drill of the desired diameter. The basic units are then strung together, horizontally and vertically, and the entire separator is thus assembled. Since the joining filaments 22 are slightly elastic, care in forming the knot 23 will insure that the filaments are under a slight tension and therefore the adjacent units will be held tightly together. In certain circumstances, the edges of the basic units may ground so as to effect a close union and prevent undesired leakage at the joints.

While the preferred composition of the mix from which the porous ceramic basic separator units are formed has been described above, the talc component may be replaced by alumina, zirconia, beryllia, and other filler materials which have a high electrical resistivity combined with a high degree of chemical inertness. Thus, by varying the qualities and quantities of the various components of the mix, other than the high temperature ceramic clay binder, I may fabricate a wide variety of porous, permeable ceramic tiles or basic separator units for assembly into large area separators for use in primary cells which depend upon the flow of chlorine or other halogen gas as an oxidizer and a material such as hydrogen, magnesium, aluminum, zinc, or iron for the reducing element.

While the preferred form and composition of my improved permeable separator has been described and shown above, many modifications, other than those previously mentioned, may suggest themselves to those skilled in the art. A further modification might consist of forming the holes 12 and 14 during the pressing operation rather than drilling. Due to the thinness of the material, however, such procedure has not been altogether satisfactory and the results have not been sufficiently uniform to warrant present replacement of the drilling method. It is intended, however, that all such modifications will fall within the spirit of the invention and the scope of the appended claims wherein I claim:

1. The method of fabricating a basic porous separator unit for assembly into a large area separator adapted for insertion between the active elements of a fuel combustion type of primary battery comprising:

intimately dry mixing 80 parts by weight of finely ground talc, 10 parts by weight of powdered barium carbonate and 10 parts by weight of ceramic clay;

slowly adding 1½ parts by weight of an hydrocarbon emulsion and 1½ parts by weight of a corn binder to said dry mix until said emulsion and said corn binder are completely distributed throughout the said dry mix;

pressing the emulsion dampened mix into thin flat rectangular tiles;

firing said tiles at a temperature of 2250° F. for a period of nine hours; and drilling holes in said fired ceramic tiles, said holes being coaxial with the vertical and horizontal axes of said thin rectangular tile where said axes are parallel to the rectangular faces of said tile.

2. A basic separator unit for assembly into a large area separator adapted for insertion between the active elements of a fuel combustion type of primary electric battery comprising a thin parallelepiped having two principal faces in the form of rectangular parallelograms and four thin edges also in the form of rectangular parallelograms, said parallelepiped being composed of 80 parts by weight of talc, 10 parts by weight of barium carbonate, 10 parts by weight of ceramic clay, 1½ parts by weight of an hydrocarbon emulsion and 1½ parts by weight of suitably mesh graded corn meal and having two apertures formed therein, said apertures being coaxial with those axes of the parallelepiped which are perpendicular to the opposed edges thereof and parallel to the principal faces thereof; each of said apertures extending from one opposed edge to the other opposed edge, and said apertures intersecting each other on the third axis of said parallelepiped, which third axis is perpendicular to the principal faces and parallel to the four thin edges thereof.

3. A basic separator unit for assembly into a large area separator diaphragm adapted for insertion between the active elements of a fuel combustion type of primary electric battery comprising a thin flat rectangular tile having two comparatively large rectangular face surfaces and four comparatively small rectangular edge surfaces and consisting of 80 parts by weight of talc, 10 parts by weight of barium carbonate, 10 parts by weight of ceramic clay, 1½ parts by weight of an hydrocarbon emulsion, and 1½ parts by weight of graded corn meal, said tile being provided with two apertures coaxial and coextensive with those tile axes parallel to the face surfaces thereof.

4. A basic separator unit for assembly into a large area separator diaphragm adapted for installation between the active elements of a fuel combustion type of primary electromotive source comprising a thin flat rectangular tile having two comparatively large rectangular face surfaces and four comparatively small rectangular edge surfaces, said tile consisting of 80 parts by weight of a chemically inert filler material taken from the group consisting of talc, alumina, zirconia and beryllia, 10 parts by weight of barium carbonate, 10 parts by weight of a suitable high temperature resisting ceramic clay, 1½ parts by weight of a suitable heavy bodied hydrocarbon emulsion, and 1½ parts by weight of graded corn meal, said tile being provided with two apertures coaxial and coextensive with the two axes of said tile lying parallel to said rectangular face surfaces thereof.

5. A separative diaphragm for separating the active elements in fuel combustion primary electric batteries comprising a plurality of small rectangular tile-like units arranged in edge-to-edge relationship to form a relatively large thin rectangular flexible plate wherein each of said tile-like units consists of a thin rectangular block of porous, high-compressive-strength ceramic materials having two comparatively large rectangular faces and four comparatively small rectangular edges, said block being provided with two apertures formed coaxially and coextensively with two of the principal axes of said block, said axes being parallel to said rectangular faces, said units being arranged with said apertures in alignment whereby a plurality of apertures throughout the breadth and length of said large thin rectangular flexible plate is formed; and elastic means threaded through said apertures for securing said units in said edge-to-edge relationship.

6. A separative diaphragm as claimed in claim 5 further characterized by said tile-like units comprising a formed thin rectangular block of high compressive strength porous ceramic materials consisting of 80 parts by weight of talc, 10 parts by weight of barium carbonate, 10 parts by weight of high temperature resisting ceramic clay, 1½ parts by weight of pitch and 1½ parts by weight of mesh-graded corn meal, said materials being intimately mixed and said block being formed from said materials under one application of high pressure and high temperature to produce a block having great compressive strength and dimensional stability.

References Cited in the file of this patent

UNITED STATES PATENTS

| | | |
|---|---|---|
| 353,141 | Kendall | Nov. 23, 1886 |
| 757,446 | Flanders | Apr. 19, 1904 |
| 895,732 | Decker | Aug. 11, 1908 |
| 1,842,186 | McBerty | Jan. 19, 1932 |
| 2,382,136 | Crowley et al. | Aug. 14, 1945 |
| 2,505,509 | Varela | Apr. 25, 1950 |
| 2,781,273 | Kock | Feb. 12, 1957 |
| 2,924,634 | Fischback et al. | Feb. 9, 1960 |